Oct. 28, 1969     L. A. VISCOLOSI     3,474,492
EVISCERATING APPARATUS AND METHOD
Filed Nov. 30, 1966                4 Sheets-Sheet 1

INVENTOR
LOUIS ANTHONY VISCOLOSI
BY
*William Frederick Werner*
ATTORNEY

Oct. 28, 1969  L. A. VISCOLOSI  3,474,492
EVISCERATING APPARATUS AND METHOD
Filed Nov. 30, 1966  4 Sheets-Sheet 2

INVENTOR
LOUIS ANTHONY VISCOLOSI
BY
William Frederick Werner
ATTORNEY

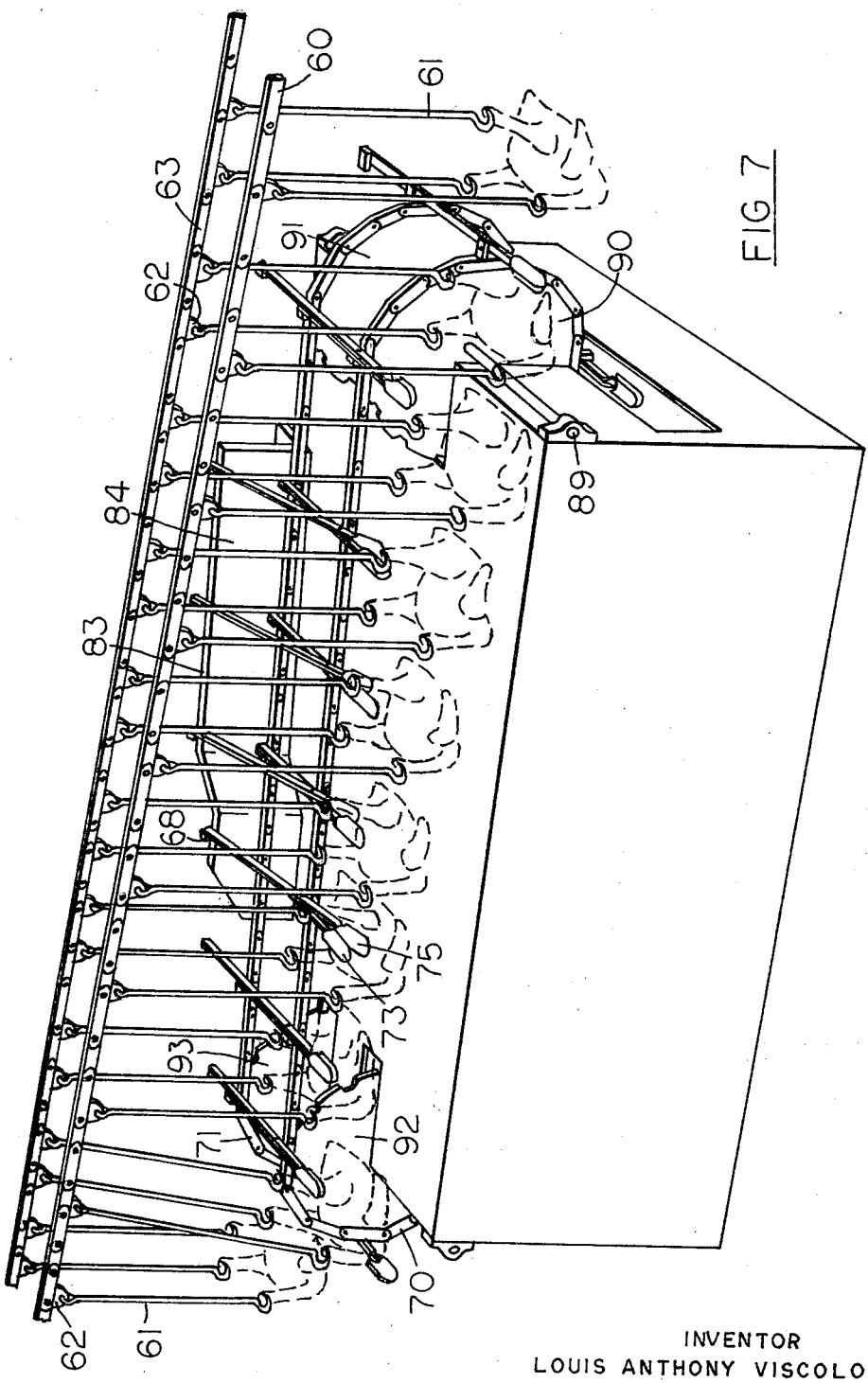

Oct. 28, 1969                L. A. VISCOLOSI                3,474,492
                    EVISCERATING APPARATUS AND METHOD
Filed Nov. 30, 1966                                    4 Sheets-Sheet 4
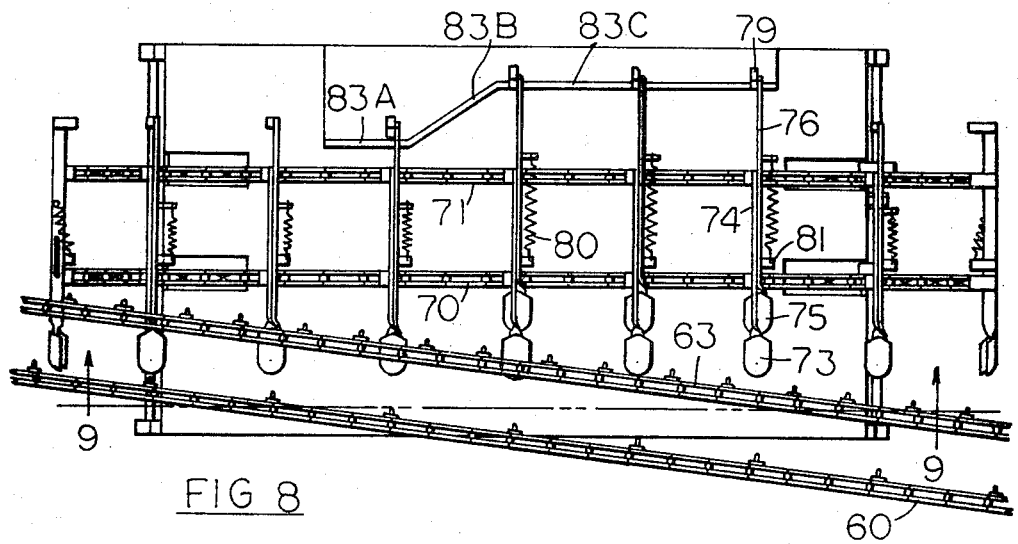

United States Patent Office 3,474,492
Patented Oct. 28, 1969

3,474,492
EVISCERATING APPARATUS AND METHOD
Louis Anthony Viscolosi, 5 Pasco Drive,
Johnston, R.I. 02919
Filed Nov. 30, 1966, Ser. No. 597,952
Int. Cl. A22b 5/18; A22c 21/02
U.S. Cl. 17—45                                          19 Claims

ABSTRACT OF THE DISCLOSURE

The eviscerating apparatus employs a shovel on an elongated member which is inserted through a slit opening in poultry to hold the poultry under the breast. A second shovel also on an elongated member nests within the first shovel. Mechanical means are provided to effect a plier-like motion so that the second shovel moves downward from the first shovel and is withdrawn from the poultry while scooping out the viscera before it.

---

This invention relates to an apparatus for eviscerating poultry such as chickens, turkeys and the like. More particularly, this invention relates to a machine which has the additional attribute as indicated above plus the fact that it may be utilized in an assembly line fashion.

It will be appreciated that the manner in which the poultry and the like are eviscerated leaves much to be desired, particularly when poultry must be eviscerated by manual operation. In other words, in the earlier prior art stages, it was necessary for human manual labor to slit the chicken along the bottom portion of its body and to reach into the carcass by hand in order to remove the viscera. This operation is exceedingly messy and is not a pleasant task to be doing all day long. Additionally, it will be appreciated that the handling of poultry that are maintained at relatively low temperatures in refrigerated rooms will increase the discomfort to the poultry workers.

Various attempts have been made to alleviate the working conditions by converting the evisceration process into a purely mechanical operation utilizing an apparatus to effect the evisceration with only a modicum of manual attendance. Along lines of this furtherance of the state of the art, Louis Viscolosi in Patent No. 2,975,459 designed and disclosed an ingenious apparatus for accomplishing evisceration of poultry. While the earlier Viscolosi apparatus was an enormous forward step in the art, it left something to be desired. For instance, it was still necessary to retain a manual holding of the poultry carcass while the eviscerating machine accomplished its functions. Furthermore, as long as manual attendance continued to be required, the machine could not be set up for an assembly line system for complete automation or as in this case a dis-assembly line system.

Accordingly, the present invention improves the state of the art from the earlier Viscolosi patent to a point where a minimum degree of manual attendance is needed, so that the bird, by virtue of the instant invention, requires only an initial placement while the machine undertakes a complete operation to eviscerate the bird.

Referring to the drawings where similar characters of reference refer to like parts:

FIGURE 7 is a perspective view of the instant device adapted to a continuous system.

FIGURE 8 is a top plan view of the view shown in FIGURE 7.

FIGURE 9 is a view taken on line 9—9 of FIGURE 8.

FIGURE 10 illustrates the removal shovel arrangement used in the continuous system.

Figure 1:
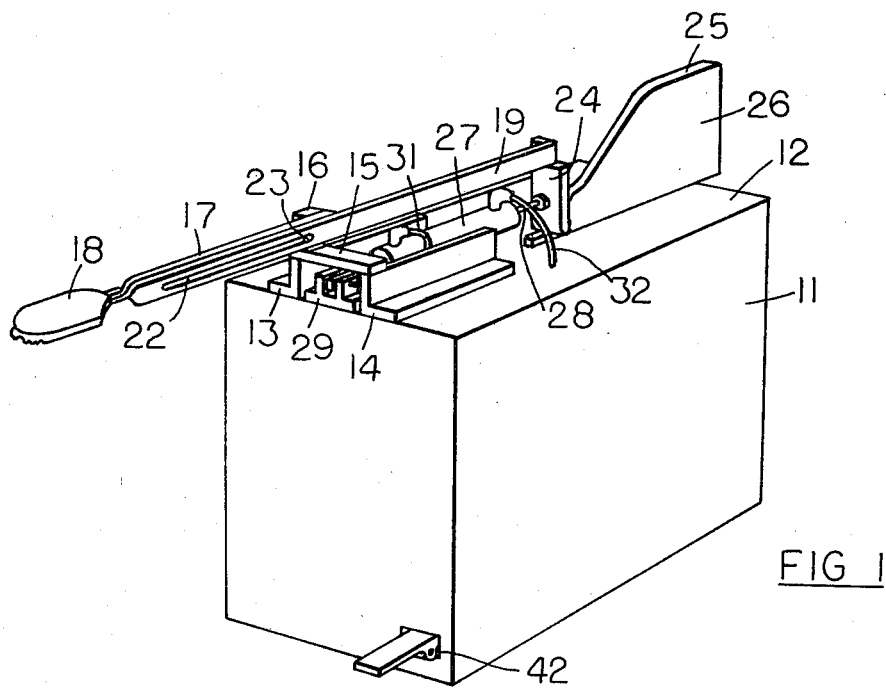
FIGURE 1 is a perspective view of the new and improved eviscerating machine, showing the device in a position to accept a poultry carcass.

Now, turning to the drawings, attention is directed to FIGURE 1, which shows the machine of the present invention mounted upon a suitable housing 11. On the top 12 of said housing 11 there are mounted two right-angle brackets, that is, left bracket 13 and right bracket 14, which are in spaced parallel relationship. Connecting bar 15 is mounted across the top of the angle brackets 13 and 14, on which is mounted vertical element 16. An elongated member 17 is fastened to the upright 16 and extends horizontally beyond the housing 11, terminating in an upside down, horizontally positioned shovel 18. In juxtaposition with elongated member 17 is another elongated member 19 which also extends forwardly and terminates in an upside down shovel 20, more clearly shown in FIGURE 4, but obscured from view in FIGURES 1 and 2, as being directly below shovel 18 and nesting therein. An elongated slot 22 extends a substantial distance in member 19. A pin 23 is adapted to ride in the slot 22 and acts as a variable pivot fulcrum for said member 19. The pin 23 is mounted on elongated member 17 in a horizontal manner and perpendicular thereto. As shown in FIGURE 1, it will be seen that the pin 23 in member 17 restricts further forward movement of member 19. A downwardly pointed cam follower 24 is mounted at the rear of elongated member 19. The cam follower 24 is adapted to ride on the cam surface 25 of vertical wall 26, secured perpendicularly to the back portion of top 12.

Figure 2:
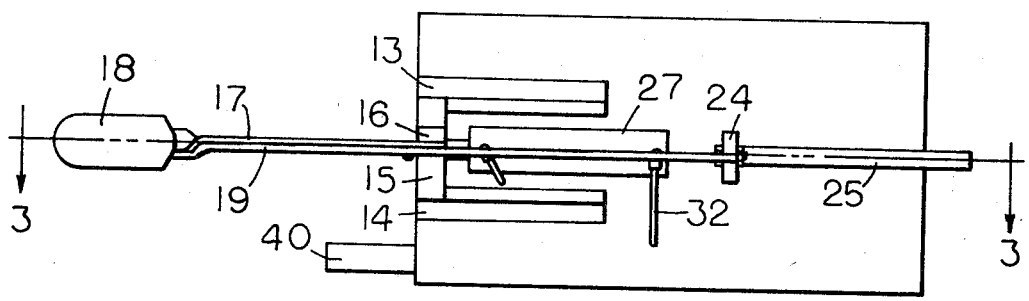
FIGURE 2 is a top plan view of FIGURE 1.
Figure 3:
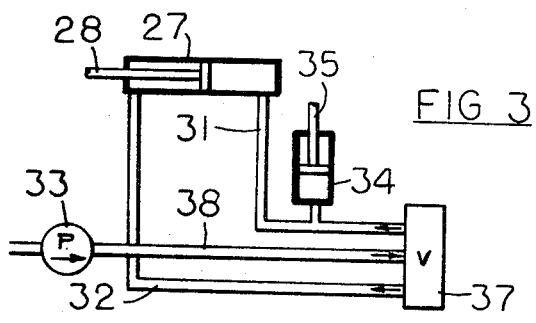
FIGURE 3 is a diagrammatic arrangement of the air cylinders and valve means showing the former in cross-section.

An air cylinder 27 is positioned between angle brackets 13 and 14 in a horizontal manner, with its piston rod 28 extending rearwardly, having the end thereof secured perpendicularly to the cam follower 24. As shown in FIGURE 2, the air cylinder 27 is in a retracted position. The air cylinder 27 is mounted upon a bifurcated bracket 29 and is journalled between the legs thereof for pivoting movement through a vertical plane. The air cylinder 27, of course, has the usual air admitting conduits 31 and 32.

Figure 4:
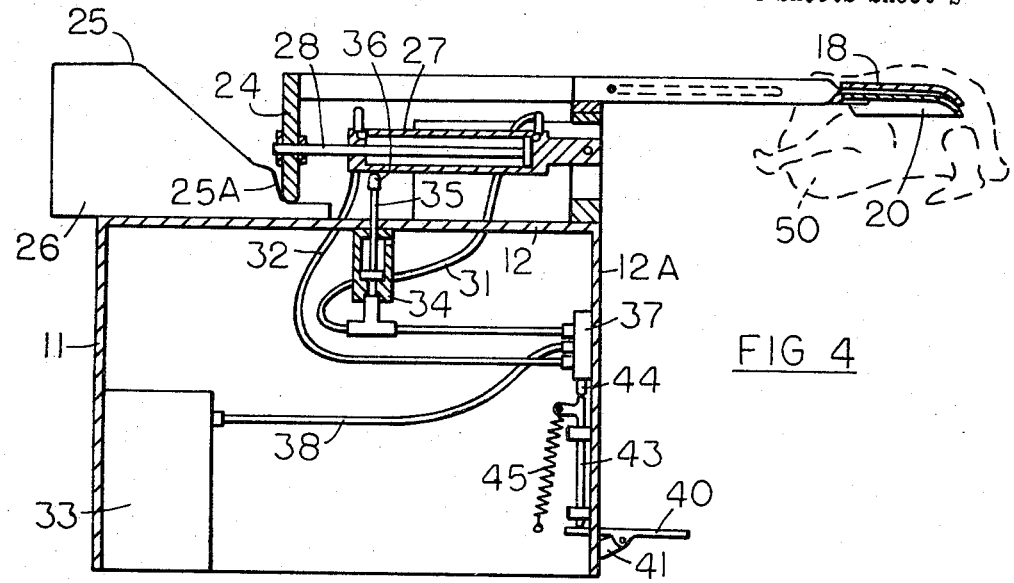
FIGURE 4 is a cross-sectional view taken along line 3—3, showing the machine in an initial stage of operation.
Figure 5:
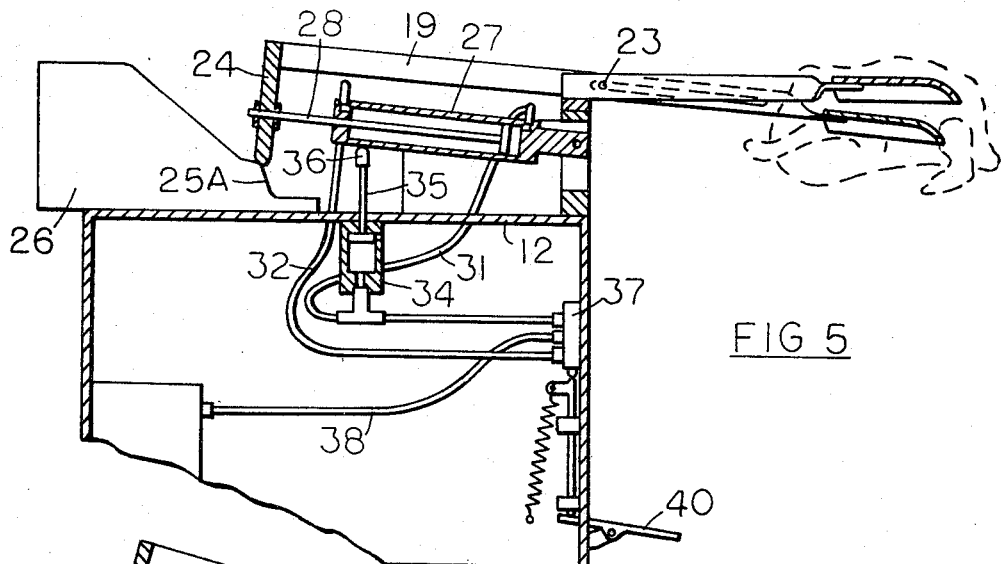
FIGURE 5 is the same view as in FIGURE 4, showing a later stage of operation of the machine.

Attention is now directed to FIGURE 4 for a further description of the machine. It will be noted that the housing 11 contains a conventional compressor 33 for supplying the air under considerable pressure for operating cylinder 27. Besides cylinder 27, it will be noted that another air cylinder 34 is positioned vertically directly below the top 12 of housing 11 and has its piston rod 35 with its end portion thereof in abutment with the free end portion of the air cylinder 27. A conventional valve 37 is mounted internally of the housing on the forward wall 12A. The compressor supplies air under pressure to valve 37 by means of conduit 38. Valve 37 is connected to the air cylinders by means of conduits 31 and 32.

The valve 37 is operated through foot treadle 40 which is pivotally mounted on bracket 41. On the forwardly extending outer wall 12A treadle 40 extends into housing 11 through an opening 42. A vertically positioned rod 43 is slideably mounted to operate the valve 37 which takes the form of a conventional sliding valve having a downwardly extending actuating plunger 44. Sliding rod 43 is downwardly urged by means of spring 45. It will be appreciated that the valve 37 is in a normal open position so that compressed air is not supplied to the cylinders 27 and 34 and conduit 31 is exhausted to the atmosphere. When treadle 40 is depressed, the sliding valve admits air to conduit 31 to pressurize the pistons of the air cylinders 27 and 34 and conduit 32 is exhausted to the atmosphere.

Figure 6:
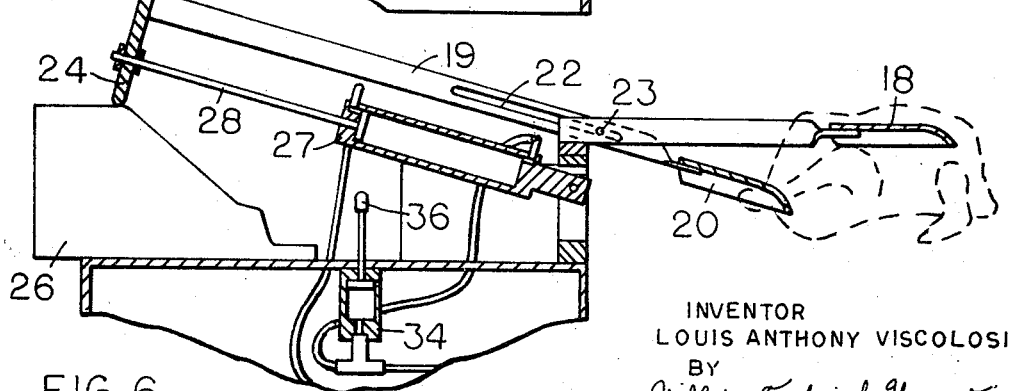
FIGURE 6 is also like FIGURE 4, but shows the machine in still a later stage of operation.

In operation, a carcass of a bird 50 as shown by dotted lines is first slit along the bottom portion thereof in the usual manner and thrust upon nested shovels 18 and 20, as shown in FIGURE 4. In other words, the shovel 18 along with nesting shovel 20 is positioned internally of the carcass through its slit opening. When this has been accomplished, treadle 40 is depressed permitting compressed air to be supplied to cylinders 27 and 34. As the rod 28 of cylinder 27 moves rearwardly of FIGURE 1, it will be appreciated that the cam follower 24 will have considerable resistance due to the almost vertical condition of the initial portion of cam surface 25A. To assist in the operation of the apparatus, air cylinder 34 is utilized to raise the air cylinder 27 to give it its initial start beyond cam follower surface 25A. It wll be seen that the cylinder 27 by being pivotally mounted moves upwardly in the rear portion thereof. As this is accomplished, the shovel 20 moves downwardly by virtue of rotation of elongated member 19 about pin 23. Shovel 18 remains stationary to hold the bird in position. As further progress is made by virtue of the operation of air cylinder 27, the elongated member 19 is moved rearwardly and upwardly. Pin 23 continues to act as a fulcrum for elongated member 19, but moves from a rearward position in slot 22 as the cylinder is extended to its full useful position, as shown in FIGURE 6 where the cam follower has risen to the top of wall 26 to its most forward position. It will be seen that as the movement of shovel 20 occurs, it has been withdrawn from the carcass through the slit opening, but in so doing has plow-like removed the viscera while moving out of the carcass.

When the operation has been concluded, the bird is removed from shovel 18 and treadle 40 is released so that valve 37 is again operated to return to its former position, permitting air cylinder 27 to return to its normal position under the influence of the compressed air supplied by conduit 32 while the weight of air cylinder 27 on rod 35 in air cylinder 34 forces this air cylinder 34 to retract inasmuch as it is exhausted to the atmosphere through conduit 31.

It will be appreciated that the foregoing description of the apparatus of the present invention may be further refined and adapted for assembly line operation. Accordingly, attention is directed to FIGURES 7–10 for further elucidation of this concept. FIGURE 7 is a perspective view of such an assembly line. It will be noted that fragments of each of two overhead endless chains 60 and 63 are positioned in parallel spaced relationship. The first chain 60 is forward of the second chain 63 and each has pivotally hanging therefrom through tabs 62 a plurality of elongated hooks 61. The number of hooks 61 depending from chain 63 is double in number to those on chain 60. Additionally, the two chains 60 and 63 are synchronized so that the hooks 61 of the respective chains are staggered with a hook of chain 60 positioned intermediate every other pair of hooks 61 on chain 63. The hooks 61 are utilized to carry a decapitated bird as shown. For instance, a hook of chain 60 has its point inserted into the neck of the bird, while the two opposite corresponding hooks of chain 63 have their points inserted into each of the legs of the bird. The bird is situated so that its breast is facing upwardly and, of course, has been previously slit as before.

Below and displaced rearwardly from chains 60 and 63 are endless chains 70 and 71 which move through a vertical plane and are in parallel spaced relationship to each other. Chains 70 and 71 carry the shovel assembly means 72 which corresponds to the previous arrangement but has been adapted for automatic operation.

FIGURE 10 is more clearly illustrative of the modified arrangement, showing shovel 73 mounted at one end of elongated member 74. Nesting shovel 75 is mounted at one end of elongated member 76 which has a slot 77 and is pivoted on pin 78 mounted perpendicularly and horizontally on elongated member 74. A cam follower 79 is secured to substantially the end portion of elongated member 76. A spring 80 is mounted at one end to a bracket 81 and at the other end to a horizontal perpendicular pin 82 which is affixed to the elongated member 76 intermediate the slot 77 and the cam follower 79. The spring biases shovels 73 and 75 into nesting relationship. Elongated member 74 is mounted transverse the conveyor system composed with bracket 81 mounted on chain 70 and bracket 69 mounted on chain 71. An ingenious cam upwardly facing surface 83 on vertical wall 84 is provided rearwardly of the conveyor system and extends above said system. The cam follower 79 rides on the surface with its forward vertical side on the uppermost rearwardly facing portion of wall 84 and that downwardly facing portion of member 76 forming a cam following corner 68 with cam follower 79, rides on the cam surface 83, thereby operating the shovel arrangement as will be further described below.

From FIGURE 8, it will be noted that the cam surface 83 is the sum total of varying surfaces beginning with a forward vertically rising portion 83–A, then a rearwardly extending surface 83–B, culminating in an elongated surface 83–C, which is parallel to said lower conveyor system. Additionally, it will be noted that endless chains 60 and 63 form an acute angle with respect to the lower conveyor system.

Especially from FIGURE 9 it will be seen that the conveyor system carries a plurality of shovel means, bringing forth a series of shovel means as needed to which a bird is mounted for eviscerating and then the bird is stripped from the shovel means after it has been eviscerated at the end of the conveyor system while the endless chains 60 and 63 continue to carry the bird.

In operation, individual poultry are mounted by means of hooks 61 to the left of FIGURE 7, for instance, and are carried to a position opposite the first shovel means where the bird is thrust upon the nesting shovels through an appropriate slit which has already been made in the poultry. The upper endless chains 60 and 63 are synchronized with one another and with the lower conveyor means so all move at the same speed. As the poultry is carried to the right, as shown in FIGURE 7, the cam following corner 69 initially comes in contact with cam surface 83–A and is raised thereby, so that the lower shovel 75 is withdrawn from its nesting relationship. The operation is similar to that described in connection with the first embodiment. As its vertical ascendancy is completed, the cam following corner 69 then moves along cam surfaces 83–B and concomitantly the shovel 75 is withdrawn from the bird and, therewith, the viscera. As the cam following corner 69 moves along cam surface 83–C, due to the movement of the conveyor system, the bird, by being held on shovel 73, is placed under tension with respect to endless chains 60 and 63, due to the fact that the latter is gradually moving away from the lower conveyor system. When the cam following corner has reached the end of surface 83–C and wall 84, the shovels 73 and 75 return to their normal nesting relationship under the influence of spring 80. As the conveyor system approaches the end before its downswing, the tension has been increased to the point that the bird is forcibly withdrawn from the shovel means, then swings free thereof to permit the hooks to resume their natural vertical position. The bird may then be carried off for further treatment.

The lower conveyor system then carries the shovel means to the other end for reuse. Attention is directed to FIGURE 9 showing the internal workings of the housing 85 through which the conveyor system moves and is driven by an electric motor 86 through a speed reducing chain 87 and small sprocket gear 88 which is keyed to a shaft 89, thereby driving gears 90 and 91 which are also keyed to shaft 89. On the other side, sprocket gears 92 and 93 merely idle.

Suitable means may be provided, such as a delivery chute or the like, for receiving the viscera as accumulated due to the removal thereof from the poultry.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. An eviscerating apparatus comprising a pair of nestable members adapted to be inserted into the body cavity of a bird in nested relationship and means for moving one of said members away from the other member and out of the body cavity to remove the viscera therefrom, said means maintaining said other member stationary during said movement to provide support for the bird.

2. The apparatus as set forth in claim 1 wherein said one member is scoop-shaped.

3. The apparatus as set forth in claim 1 wherein both of said members are generally scoop-shaped.

4. The apparatus as set forth in claim 1 wherein said moving means further comprises means for causing the leading ends of said members to diverge at a more rapid rate than the trailing ends of said members whereby said one member assumes an angular position with respect to said other member during its withdrawal from the body cavity.

5. The apparatus as set forth in claim 4 wherein the leading end of said one member diverges away from the general plane of its body section and away from said other member.

6. The apparatus as set forth in claim 5 wherein the diverging portion of said leading end of said one member has a toothed edge.

7. In a bird eviscerating apparatus having removal means insertable into the body cavity of the bird and operative upon withdrawal to remove the viscera therefrom, the improvement comprising bird positioning means having a member insertable into the body cavity of said bird through the same opening as said removal means and means for retaining said member generally stationary with respect to the bird during withdrawal of said removal means.

8. The apparatus as set forth in claim 7 wherein said member is shaped so as to conform generally to the configuration of a section of the interior body cavity boundary of a bird.

9. A method for positioning fowl to permit insertion and viscera-removing withdrawal of a tool into the body cavity thereof through an opening therein, said method having the steps of: inserting a suspending member into the body cavity of the fowl through the same said opening to support the fowl; and maintaining said member within said cavity in relatively stationary position with respect to said bird during withdrawal of said tool.

10. A method of eviscerating poultry comprising the steps of: inserting a pair of members into the body cavity thereof through the same opening therein; maintaining one of said members in generally stationary relationship with respect to said body cavity to support said poultry while withdrawing the other to scrape the viscera from said body cavity.

11. A method of eviscerating poultry comprising the steps of:
 inserting a pair of nested members into the body cavity of said poultry; and
 moving one of said members away from the other member and out of the body cavity to remove the viscera therefrom while maintaining said other member generally stationary during said moving to provide support for said poultry.

12. Apparatus for eviscerating poultry suspended from a first conveyor means and carried along a predetermined path thereby, said apparatus comprising:
 second endless conveyor means having a section of its periphery running adjacent said path, said second conveyor means having a series of eviscerating members affixed thereto in spaced fashion for movement along said path, each of said eviscerating members having a shovel-like extremity extending generally toward said path, said extremity being insertable into said poultry through a previously made slit in the carcass thereof;
 cam follower means affixed to said eviscerating members;
 cam track means positioned adjacent said second conveyor means for engaging each of said follower means as they are conveyed along said section of said second conveyor means, the configuration of said track means being such as to cause said shovel-like extremity to make a viscera engaging and withdrawing motion with respect to poultry suspended from said first conveyor means during passage along said section whereby said shovel-like extremity will engage and withdraw the viscera from poultry positioned thereover during passage of said poultry along said section.

13. The apparatus as set forth in claim 12 which further comprises means movable with said second conveyor means for retaining said poultry in a fixed position with respect to said second conveyor means during said engaging and withdrawing motion, one of said retaining means being provided for each of said members.

14. The apparatus as set forth in claim 13 which further comprises spring means for returning said shovel-like extremity toward its initial position subsequent to disengagement of said follower means from said track means but prior to re-engagement thereof at the opposite extremity of said track.

15. The apparatus as set forth in claim 12 wherein said first and second conveyor means move at identical lineal speeds.

16. Eviscerating apparatus comprising:
 holding means for holding a bird against movement in at least one direction;
 arm means having a free end extending generally in a direction opposite to said one direction, said free end having a scoop means affixed thereto;
 force means for moving said arm in at least said one direction;
 pivot mounting means located between said scoop means and said force means for pivotally mounting said arm about a pivot point located between said scoop means and said force means;
 cam follower means operatively connected to said arm and cam means separate from said bird on which said cam follower means rides for causing said arm to pivot about said pivot point;
 said cam means being so configurated as to cause said scoop means to move along a predetermined path within a fowl being held by said holding means such as to scoop and remove the viscera therefrom.

17. The eviscerating apparatus of claim 16 in which the force means is mounted offset from said arm means to exert a force in said one direction generally parallel to said arm means.

18. The eviscerating apparatus of claim 16 in which the cam follower means and cam are located proximate the end opposite said free end of said arm means.

19. The eviscerating apparatus of claim 17 in which the cam follower means and cam are located proximate the end opposite said free end of said arm means.

References Cited

UNITED STATES PATENTS

| | | | |
|---|---|---|---|
| 1,798,585 | 3/1931 | Bookheim | 17—11 |
| 1,943,077 | 1/1934 | Jansen | 17—11 |
| 1,986,195 | 1/1935 | Griffin | 17—11 |
| 2,774,101 | 12/1956 | Ograbisz | 17—11 |
| 2,975,469 | 3/1961 | Viscolosi | 17—11 |
| 3,104,418 | 9/1963 | Seguar | 17—11 |

LUCIE H. LAUDENSLAGER, Primary Examiner

U.S. Cl. X.R.

17—11